US012126404B2

(12) United States Patent
Wilhelmsson et al.

(10) Patent No.: US 12,126,404 B2
(45) Date of Patent: Oct. 22, 2024

(54) SIMULTANEOUS UPLINK AND DOWNLINK TRANSMISSION USING MULTIPLE ACCESS POINTS

(71) Applicant: Telefonaktiebolaget LM Ericsson (publ), Stockholm (SE)

(72) Inventors: Leif Wilhelmsson, Lund (SE); Lakshmikanth Guntupalli, Lund (SE); Miguel Lopez, Solna (SE); Dennis Sundman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 17/639,636

(22) PCT Filed: Sep. 18, 2019

(86) PCT No.: PCT/EP2019/075061
§ 371 (c)(1),
(2) Date: Mar. 2, 2022

(87) PCT Pub. No.: WO2021/052581
PCT Pub. Date: Mar. 25, 2021

(65) Prior Publication Data
US 2022/0302964 A1   Sep. 22, 2022

(51) Int. Cl.
*H04B 7/024* (2017.01)
*H04B 7/06* (2006.01)
(Continued)

(52) U.S. Cl.
CPC ........... *H04B 7/024* (2013.01); *H04B 7/0617* (2013.01); *H04W 16/14* (2013.01); *H04W 72/542* (2023.01)

(58) Field of Classification Search
None
See application file for complete search history.

(56) References Cited

U.S. PATENT DOCUMENTS 9,917,682 B2    3/2018  Zhang et al.
2001/0003443 A1*  6/2001  Velazquez ............. H04W 16/28
                                                    455/562.1
(Continued)

FOREIGN PATENT DOCUMENTS

EP          3376807 A1    9/2018
JP       2006352889 A    12/2006
(Continued)

OTHER PUBLICATIONS

Boccardi, Frederico, et al., "Why to Decouple the Uplink and Downlink in Cellular Networks and How To Do It", IEEE Communications Magazine, vol. 54, No. 3, Mar. 23, 2015, pp. 1-14.
(Continued)

*Primary Examiner* — Benjamin Lamont
(74) *Attorney, Agent, or Firm* — Murphy, Bilak & Homiller, PLLC

(57) ABSTRACT

A method of a first access point and an access point arranged to provide wireless communication access for a wireless communication system are disclosed. The method comprises determining that a first station is to transmit uplink data in an uplink transmission at a first frequency band in the unlicensed spectrum, assigning a second access point for receiving the uplink transmission, wherein the second access point is covering at least an overlapping area with a coverage area of the first access point, determining a second station targeted for downlink transmission, wherein the downlink transmission is scheduled for at least partly simultaneous transmission with the uplink transmission from the first station and at least partly overlapping the first frequency band, wherein a selection of the second station targeted for downlink transmission is based on a spatial relationship between the first and second stations, assigning antenna weights for an array antenna of the first access point to provide beamforming transmission of the downlink trans- (Continued)

mission towards the second station and a null towards the second access point, and transmitting the downlink transmission using the antenna weights. The access point is arranged to perform the method.

18 Claims, 6 Drawing Sheets

(51) Int. Cl.
*H04W 16/14* (2009.01)
*H04W 72/542* (2023.01)

(56) References Cited

U.S. PATENT DOCUMENTS

| | | |
|---|---|---|
| 2007/0066239 A1 | 3/2007 | Hart |
| 2010/0151897 A1 | 6/2010 | Li et al. |
| 2015/0092621 A1* | 4/2015 | Jalloul ................ H04L 5/1461 |
| | | 370/278 |
| 2015/0270882 A1* | 9/2015 | Shattil .................. H04B 7/024 |
| | | 370/329 |
| 2015/0288427 A1 | 10/2015 | Wang et al. |
| 2018/0184435 A1* | 6/2018 | Cariou ................... H04L 27/18 |
| 2018/0324596 A1 | 11/2018 | Xiang et al. |
| 2019/0036583 A1* | 1/2019 | Cherian ............... H04B 7/0617 |
| 2019/0081664 A1* | 3/2019 | Vermani ............... H04L 5/0035 |
| 2019/0159220 A1 | 5/2019 | Elsherif et al. |
| 2020/0137702 A1* | 4/2020 | Patil .................... H04W 56/002 |

FOREIGN PATENT DOCUMENTS

| | | |
|---|---|---|
| JP | 2014042270 A | 3/2014 |
| JP | 2014187540 A | 10/2014 |
| JP | 2016501465 A | 1/2016 |
| WO | 2019051338 A1 | 3/2019 |

OTHER PUBLICATIONS

Yadav, Animesh, et al., "Energy and Traffic Aware Full-Duplex Communications for 5G Systems", IEEE Access, vol. 5, Digital Object Identifier 10.1109/ACCESS.2017.2696822, 2017, pp. 11278-11290.

* cited by examiner

Location Map

SIMULTANEOUS UPLINK AND DOWNLINK TRANSMISSION USING MULTIPLE ACCESS POINTS

TECHNICAL FIELD

The present invention generally relates to a method performed by an access point for a wireless system, and such an access point.

BACKGROUND

To achieve very high spectrum efficiency in a wireless communication system, it is desirable to reuse available resources as much as possible. Somewhat simplified, one can try to achieve high spectrum efficiency by ensuring that bandwidth allocated to one specific area, or cell, is used efficiently and in addition that the same bandwidth can be reused by another area, or cell, without requiring that the distance between the two areas, or cells, has to be very large. In this disclosure a primary interest is in the former, i.e., how to enhance the spectrum efficiency within an area or cell.

The use of multiple antennas at both the transmitter and the receiver is an efficient means to ensure high spectrum efficiency. Multiple antennas can be used both to achieve beam-forming which results in higher signal-to-noise-ratio (SNR) at the receiver, and for spatially multiplexing two or more streams, potentially increasing the total data rate significantly. Beamforming is also effective in reducing or even eliminating the interference caused to other devices.

U.S. Pat. No. 9,917,682 B2 discloses an approach for interference management in a cellular network which employs Space-Division uplink and downlink Duplexing (SDD). A base station assigns a plurality of radio units for transmit operation, i.e., downlink transmissions, and a plurality of radio units for receive operation, i.e., for uplink reception. Spatial beamforming is employed by the radio units to suppress mutual interference by their simultaneous operation on a common frequency band.

Another technique which has been discussed to further improve the spectrum efficiency is simultaneous transmit and receive (STR), also commonly referred to as full duplex (FD). The idea with STR is that a device can transmit and receive simultaneously using the same channel. By doing so, one would potentially gain a factor of two in spectrum efficiency. It may be possible to gain even more by also taking improvements on the MAC layer into account, whereas the gain probably may be much less taking into account that often there is no traffic available to schedule in both directions simultaneously. Irrespectively of what gain can be obtained, STR comes with a challenge in that the desired signal intended for the receiver may be more than 100 dB weaker than the transmitted signal, thus requiring substantial self-interference (SI) cancellation in the device. In addition, the complexity that is caused by the SI cancellation does not scale well with MIMO, since every transmitted signal must be cancelled for every received signal. For example, in case of an 8×8 MIMO system, which is not unreasonable, there will be 64 instances of SI cancellation.

Yet another technique for enhancing the spectrum efficiency in a system is to make use of two or more transmission points, e.g. two or more access points (AP)s. Using more than one AP has fundamentally two advantages. The first is that the available distance from an AP to the stations (STA) typically will be smaller. The second advantage is that spatial diversity gain may be obtained, where the diversity gain is applicable both for the fast small-scale fading as well as for the slow shadowing.

The potential gains from STR as well as from multi-AP transmission are fairly complicated to realize in practice. As already mentioned, STR puts very hard requirement on SI cancellation. Multi-AP transmission, on the other hand, puts very hard requirements on synchronization of the APs involved. Tight synchronization means overhead in order to achieve and maintain the synchronization, and it may also add cost as the frequency stability to start with may have to be reasonably good to allow synchronization to be achieved with reasonable overhead.

The above information disclosed in this section is only for enhancement of understanding of the background of the invention and therefore it may contain information that does not form the prior art that is already known to a person of ordinary skill in the art.

SUMMARY

The invention is based on the inventors' realization that improved spectrum efficiency can be achieved by efficient use of multi-AP deployments in combination with multi-antenna technology.

According to a first aspect, there is provided a method of a first access point arranged to provide wireless communication access for a wireless communication system. The method comprises determining that a first station is to transmit uplink data in an uplink transmission at a first frequency band in the unlicensed spectrum, assigning a second access point for receiving the uplink transmission, wherein the second access point is covering at least an overlapping area with a coverage area of the first access point, determining a second station targeted for downlink transmission, wherein the downlink transmission is scheduled for at least partly simultaneous transmission with the uplink transmission from the first station and at least partly overlapping the first frequency band, wherein a selection of the second station targeted for downlink transmission is based on a spatial relationship between the first and second stations, assigning antenna weights for an array antenna of the first access point to provide beamforming transmission of the downlink transmission towards the second station and a null towards the second access point, and transmitting the downlink transmission using the antenna weights.

The assigning of the second access point for receiving the uplink transmission may include signalling between the first and second access points. The signalling between the first and the second access points may be provided via a wired interface between the first and the second access points.

The determining that the first station is to transmit uplink data may comprise scheduling the first station for the uplink transmission and signalling to the first station about performing the uplink transmission. The determining that the first station is to transmit uplink data may alternatively comprise receiving signalling from a neighbouring access point that the first station is scheduled by the neighbouring access point for uplink transmission.

The determining of the second station targeted for downlink transmission to be based on a spatial relationship between the first and second stations may include estimating a direction difference between the first station and the second station and selecting the second station prioritizing a candidate station having larger direction difference to the first station higher than a candidate station having a smaller direction difference to the first station.

The assigning of the second access point may be based on that a candidate access point for the second access point will receive the signal from the first station at a signal power above a threshold. The method may comprise selecting a candidate access point for being the second access point which will receive the signal from the first station at the highest power among candidate access points.

The method may comprise controlling transmission powers of the uplink and downlink transmissions, wherein assigning of the uplink transmission power and the downlink transmission power are balanced such that a ratio between received downlink transmission power at the second station and received interference power from the uplink transmission plus noise within the first frequency band at the second station is above a first threshold. The first threshold may correspond to a signal-to-interference ratio of 20 dB. The assigning of balanced powers may be such that a ratio between the received signal power from the uplink transmission and noise within the first frequency band at the second access point is above a second threshold. The second threshold may correspond to a signal-to-noise ratio of 20 dB. The balanced powers may be adapted such that the first and second thresholds are equal.

The method may comprise determining that a third station is to transmit uplink data in a second uplink transmission, wherein the downlink transmission is scheduled for at least partly simultaneous transmission with the second uplink transmission from the third station and at least partly overlapping the first frequency band, assigning a third access point for receiving the second uplink transmission, wherein the third access point is covering at least an overlapping area with a coverage area of the first access point, and wherein the assigning of antenna weights for the array antenna of the first access point includes providing a null towards the third access point. The assigning of the third access point for receiving the second uplink transmission may include signalling between the first and third access points. The signalling between the first and the third access points may be provided via a wired interface between the first and the third access points. The determining that the third station is to transmit uplink data may comprise scheduling the third station for the second uplink transmission, and signalling to the third station to perform the second uplink transmission. The determining that the third station is to transmit uplink data may alternatively comprise receiving signalling from a neighbouring access point that the third station is scheduled by the neighbouring access point for the second uplink transmission. The selection of the second station targeted for downlink transmission may further be based on a spatial relationship between the third and second stations and the determining of the second station targeted for downlink transmission may further be based on a spatial relationship between the third and second stations. The determining may further include estimating a direction difference between the third station and the second station and selecting the second station prioritizing a candidate station having a higher direction difference to the third station than a candidate station having a smaller direction difference to the third station. The assigning of the third access point may be based on that a candidate access point for the third access point will receive the signal from the third station at a signal power above a threshold. The method may comprise selecting a candidate access point for being the third access point which will receive the signal from the third station at the highest power among candidate access points. The method may comprise controlling transmission powers of the second uplink transmission, wherein assigning of uplink transmission power by the third station and the downlink transmission power are balanced such that a ratio between received downlink transmission power at the second station and received interference power from the first and second uplink transmissions plus noise within the first frequency band at the second station is above a threshold.

According to a second aspect, there is provided a computer program comprising instructions which, when executed on a processor of an access point, causes the access point to perform the method according to the first aspect.

According to a third aspect, there is provided an access point arranged to provide wireless communication access for a wireless communication system which operates in unlicensed spectrum. The access point comprises a transceiver, an antenna array connected to the transceiver, an interface towards neighbouring access points covering at least an overlapping area with a coverage area of the access point, and a controller arranged to control transmissions performed by the transceiver, antenna weights of the antenna array for beamforming, and the interface. The access point is arranged to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
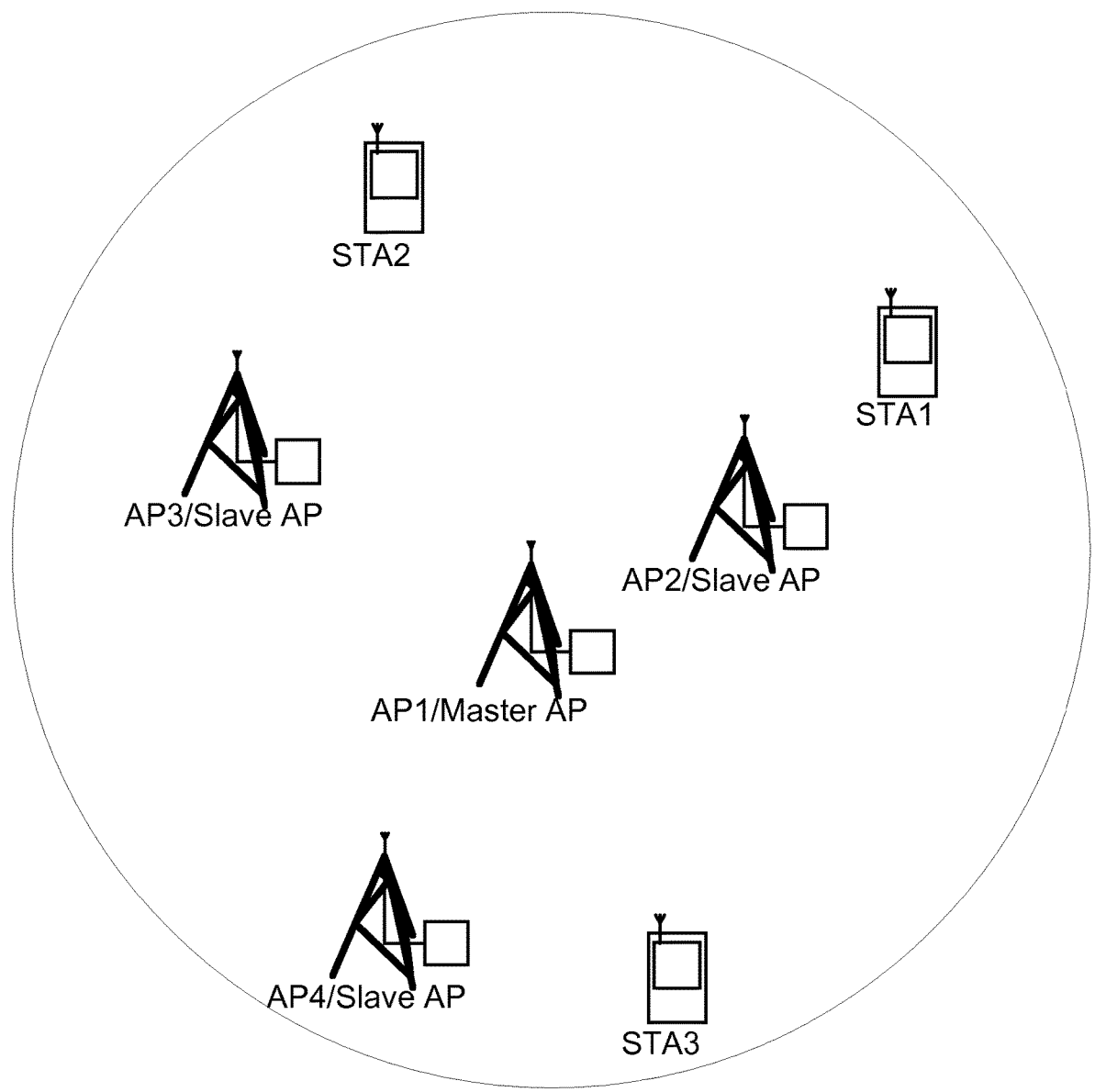
FIG. 1 schematically illustrates a deployment in an area operated by a plurality of access points and serving a plurality of stations.

This disclosure presents approaches for increasing the spectrum efficiency by using two or more APs and use STR within the area or cell. However, unlike earlier work, the STR in the cell consists of two parallel transmissions, where each one of the involved devices, AP as well as STA, is either transmitting or receiving but not both. The disclosure explores the approach of that more than one AP is available and to use one or more of them for down-link (DL) transmission and another AP(s) for up-link (UL) transmission. The problem with the STR when a single AP is used for both DL and UL is therefore avoided still obtaining the spectrum efficiency gain from STR. Moreover, what AP(s) to be used for DL and UL transmission, respectively, may be selected based on what STAs to serve for the DL and UL, respectively.

An inherent issue of self-interference cancellation in STR is in this way transformed to ensuring that sufficient isolation is achieved between the involved APs, and the involved STAs, respectively. This isolation is obtained through a combination of proper scheduling of STAs that are sufficiently apart and beamforming at the transmitting AP. The performance can be further improved if also other devices are able to use beamforming for transmission and reception, but it suffices that only the APs used for one of the directions, e.g. the DL transmitting APs, supports it. To simplify the description, still capturing the essential features of the invention, the invention will be described when the number of APs involved in DL transmission is one and where the transmission is to only one STA, and where the number of APs involved in the UL transmission is one and where only one STA is transmitting UL. The skilled reader will readily understand that the similar principles apply when including further simultaneous DL transmissions.

One of the involved APs, preferably the AP with beamforming capability, is here referred to a first AP, and can be considered to act as a Master AP, and may schedule all traffic, i.e., also the traffic it is not directly involved in. Alternatively, the first AP acts opportunistically and schedules the DL transmission based on scheduled UL transmissions.

This allows for improved spectrum efficiency in a way that makes efficient use of multi-AP deployments in combination with multi-antenna technology. By doing so, STR can be supported within an area or cell in a way that do not put hard requirements on the e.g. self-interference cancellation or tight synchronization.

For the easier understanding of the description, this disclosure will initially consider a specific deployment and adopt the terminology used in IEEE 802.11. Specifically, it will be referred to the network nodes as access points (APs) and the clients as stations (STAs). Furthermore, the approach relies on that more than one AP is used, and one of the involved APs will be referred to as a first AP or a Master AP, whereas the remaining APs involved in the communication are referred to as second AP, third AP, neighbouring AP(s), and/or Slave AP(s) depending on functional or spatial relation with the first/Master AP.

An exemplary deployment where the approach is applicable is illustrated in FIG. 1. Referring to this figure, the network consists of a first AP, or Master AP, denoted AP1 and three neighbouring or Slave APs, denoted AP2, AP3, and AP4, respectively. In this particular deployment, the coverage area of the cell is shown as being centred around AP1. This does not have to be the case, but it is seen as preferred. One reason why this is seen as preferred is that, as it will be discussed in more details later on, all Slave APs should preferably be in range of the Master AP, whereas the Slave APs may potentially not be within range of one another. In FIG. 1 there are also three STAs, denoted STA1, STA2, and STA3, respectively.

Suppose that a total of 20 MHz of bandwidth is available for the cell in FIG. 1. According to a traditional approach, typically these 20 MHz are used in a time division duplex (TDD) fashion, where the full 20 MHz is used in an alternate fashion between UL and DL transmission. Alternatively, according to another traditional approach, the bandwidth would be used in a frequency division duplex (FDD) fashion, where the 20 MHz would be divided so that e.g. the lower 10 MHz would be used for UL transmission and the upper 10 MHz would be used for DL transmission.

In the present invention, methods will be disclosed which allow for simultaneous UL and DL transmission using the full 20 MHz bandwidth for both UL and DL.

This concept may be denoted Simultaneous Uplink and Downlink (SUD) transmission, which can be viewed as a modification of Decoupled Uplink and Downlink (DUD) transmission which is discussed in Boccardi et al, "Why to decouple the uplink and downlink in cellular networks and how to do it", published in IEEE Communication Magazine in March 2016 on pages 110 to 117.

Figure 2:
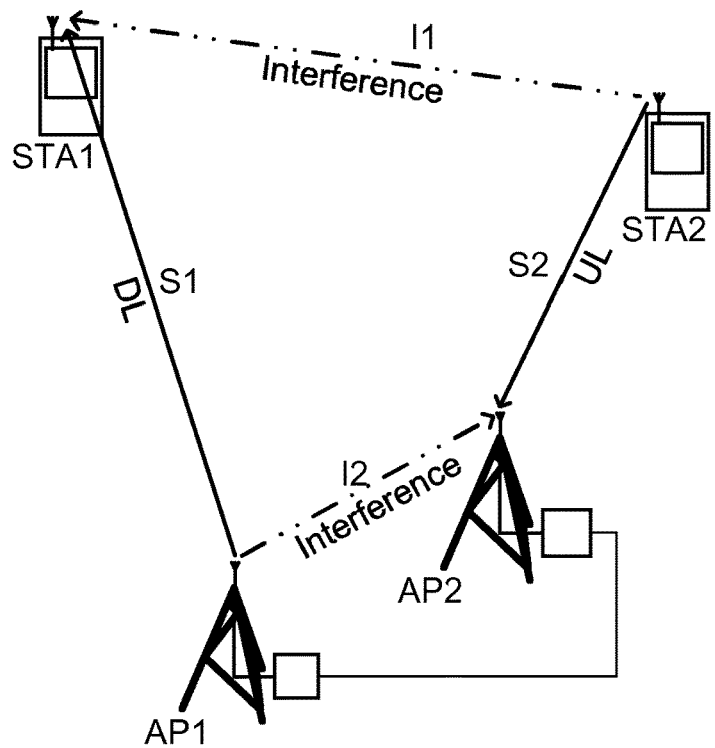
FIG. 2 schematically illustrates simultaneous uplink and downlink transmissions, and interference issues.

FIG. 2 illustrates APs and STAs involved in the concept. Suppose that the APs have a wired connection between one another. The concept also works if the connections between the Master AP and the Slave APs are wireless, but will require a bit more of scheduling and is not a preferred solution.

Further, suppose that there is DL data for STA1 and UL data for STA2. One of the APs, here a first AP, AP1, which for the situation can be considered as a Master AP, then transmits DL data to STA1 at the same time as UL data is transmitted from STA2 to a second AP, AP2, which for this situation can be considered as a Slave AP.

Referring to FIG. 2, S1 is the signal transmitted from the Master AP1 and intended for STA1 and S2 is the signal transmitted from STA 2 and intended for Slave AP2. In addition to the intended signals, the interference caused by the two transmissions are also explicitly indicated by the dashed arrows. I1 is the interference signal for STA1 resulting from the UL transmission from STA2 to Slave AP2, whereas I2 is the interference signal for Slave AP2 resulting from the DL transmission from the Master AP1 to STA1.

In order for SUD transmission to be useful, it is of course necessary to ensure that the signal-to-interference-plus-noise-ratio (SINR) is sufficiently high for both the UL and the DL transmissions. Two major components may be used to ensure this, namely scheduling and beamforming. In addition, these two components should preferably be considered jointly. With respect to scheduling, the idea is to schedule STAs that are relatively far apart from one another. Referring to FIG. 2, the reason for this is easy to appreciate. The UL transmission will simply cause interference to the DL transmission, i.e., I1 in FIG. 2, and the further apart the two STAs are the smaller this interference will typically be.

Figure 3:
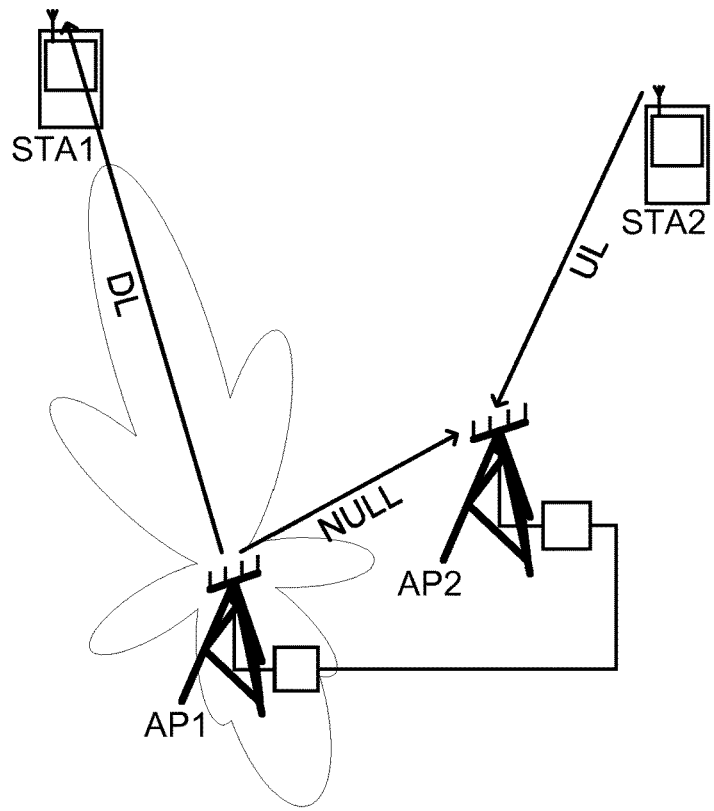
FIG. 3 schematically illustrates limiting interference of the scenario illustrated by FIG. 2 by beamforming.

The second component, and typically the most important component, is the use of beamforming. Again, referring to FIG. 2, the idea is that the interference caused by the Master AP to the UL transmission to the Slave AP2, i.e. I2 in FIG. 2, can be substantially reduced by using beamforming and placing a null in the direction of Slave AP2 as illustrated in FIG. 3, which illustrates the same setup as FIG. 2 but emphasizing the action of transmit beamforming by Master AP1 to reduce interference at the Slave AP2. Placing a null towards AP2 is considered relatively easy since both APs typically would be at fixed positions and thus it is easy to obtain good knowledge of the channel between the two APs.

Finally, it can be noted that also the ability to suppress the interference towards a Slave AP will to some extent depend on which STA is scheduled for DL transmission. Specifically, it is not desired to schedule a STA for DL transmission if this STA is located close to the Slave AP when the Slave AP is scheduled to be used for UL transmission. The reason simply being that the direction of the main lobe and the direction of the null would be very close, making the beam-pattern much more sensitive to small errors. For example, if the direction of the main beam and the null direction would only differ by, say, 5 degrees, an error of 5 degrees could means that the desired signal is sent in the null direction or that the main beam is pointed towards the desired null direction. Thus, scheduling and beamforming should be considered jointly.

Figure 4:
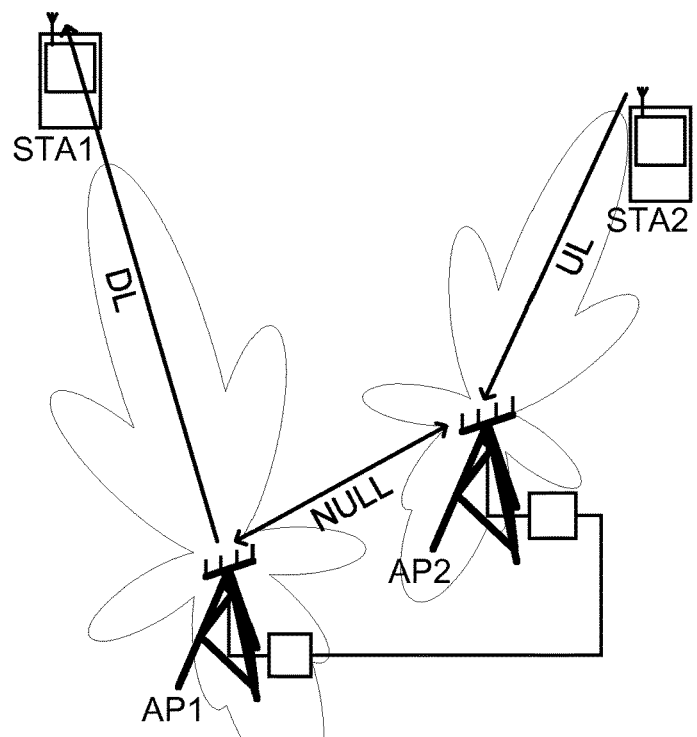
FIG. 4 schematically illustrates limiting interference of the scenario illustrated by FIGS. 2 and 3 by further beamforming.

In the example discussed above, it was only assumed that the Master AP was capable of beamforming, and in this case the beamforming was applied for the transmission of the signal. In case also the Slave APs would be able to beamform, i.e. weight antennas of an array antenna for reception, which is reasonable since most APs today are equipped with multiple antennas, the Slave AP could place a null in the direction of the Master AP, as indicated in FIG. 4 which illustrates the similar setup as FIGS. 2 and 3 but also indicating reception beamforming performed by AP2, and in this way even further attenuate the interference signal I2 indicated in FIG. 2. The nulling between the APs would thus be mutual, as indicated by the double arrows of the line indicated "NULL" in FIG. 4. Similarly, if any of the STAs, either the transmitting one or the receiving one, or both, would be able to beamform the performance could be further enhanced, which is schematically illustrated in FIG. 5 which illustrates the similar setup as FIGS. 2 to 4 but also indicating transmission/reception beamforming performed by the STAs.

However, assume for the moment that only the Master AP is capable of performing beamforming or if it is for some reason only suitable for AP1 to perform beamforming, i.e., a situation resembling the illustration in FIG. 3. In case the system is interference limited, i.e., the noise can be ignored when considering the performance of the system, it is readily seen that the SINR for the UL can be made very large if one is able to perfectly place a null in the direction of the Slave AP2. The performance for the DL, on the other hand, may be more uncertain. With proper scheduling, STA2 and STA1 should be fairly far apart, and with a little help of beamforming in the desired direction of the Master AP towards STA1, and possibly also that the transmission power of the AP may be higher than that of a STA, it is likely that S1>Is, so that the SINR>0 dB. However, one may want to have SINR>20 dB.

Another important aspect is therefore the observation that for SUD transmissions there is a trade-off between the SINR for the UL and the SINR for the DL. Specifically, ignoring the noise, it is readily seen that if the transmission power of STA2 is reduced by 1 dB this will result in that the SINR for the UL will decrease with 1 dB since S2 is decreased by 1 dB and I2 is kept the same, and the SINR for the DL will increase with 1 dB since I1 is decreased by 1 dB and S1 is kept the same. Consequently, by adjusting the relative transmission powers of the Master AP and STA2 it possible to trade the performance of the UL for the performance of the DL. Moreover, since the trade-off is dB for dB, it follows that a very relevant parameter to determine the performance for the SUD is the sum of the SINR for the UL and the DL, and assuming that it is desirable to have similar SINR for both the UL and the DL, we define the balanced SINR as $$\text{SIN} R_{bal} = \frac{1}{2} \text{SIN} R_{UL} + \frac{1}{2} \text{SIN} R_{DL}$$

Figure 5:
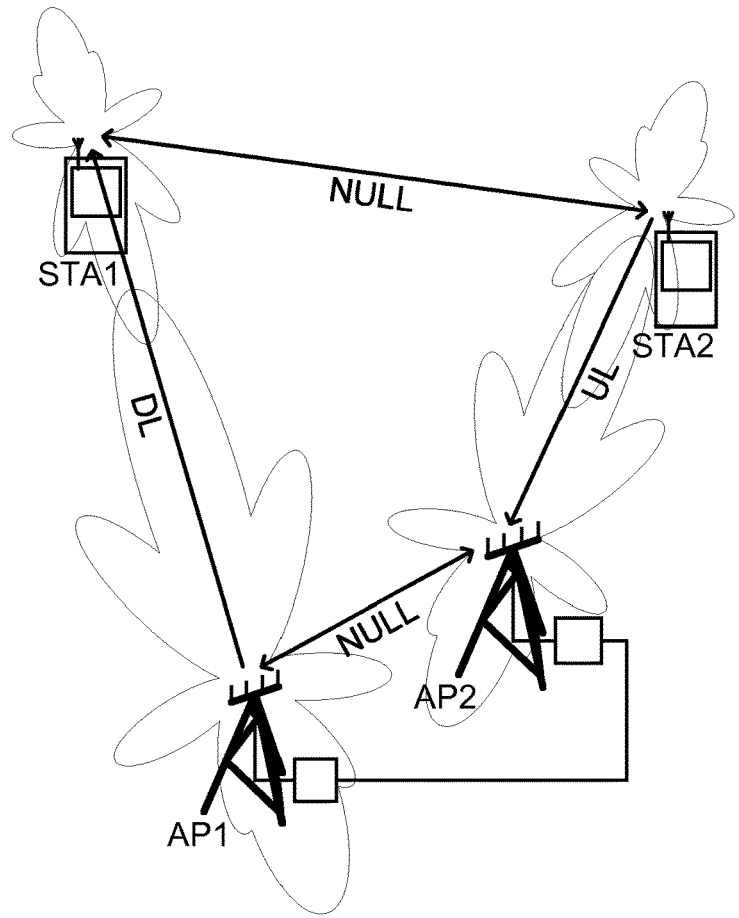
FIG. 5 schematically illustrates limiting interference of the scenario illustrated by FIGS. 2 to 4 by further beamforming.

$SINR_{bal}$ will not depend on what transmission power is allocated for the UL and DL if the noise is ignored but will instead only depend on the location of the STA, i.e. related to how the scheduling is done, and the gain obtained from beamforming, related to which ones of the devices engaged in the communication supports beamforming, as illustrated by the examples of FIGS. 3 to 5, and how many antennas are available at respective device.

Figure 6:
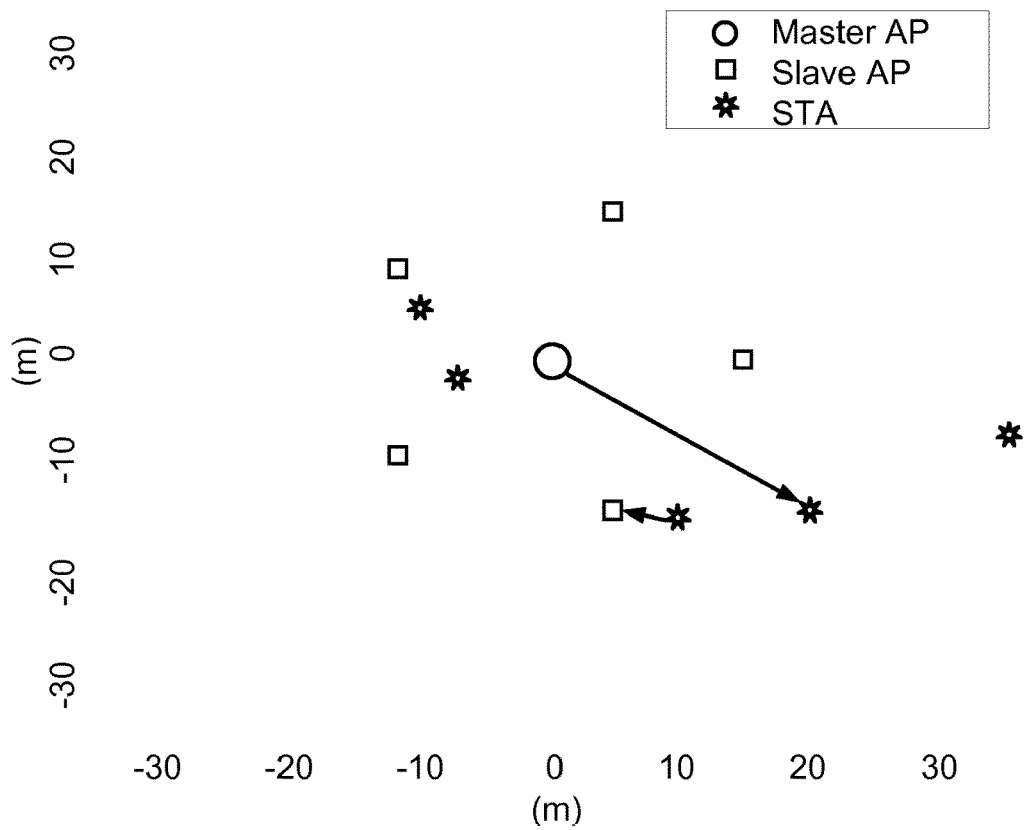
FIG. 6 illustrates a location map for an example setup.

To illustrate the concept even further, a simple simulation was performed with one Master AP and five slave APs, where the five APs were placed equidistantly in a circle with a radius of 15 meters. Then five STAs were placed randomly as illustrated in FIG. 6. The arrows in the figure indicate one specific SUD transmission. For the simulation set-up only the Master AP was using multiple antennas, and in this case the number of antennas was four arranged in a linear array with half a wavelength distance between the antenna elements. The linear array was oriented along the y-axis.

Each possible combination of SUD was considered, i.e., in total 20 possible combinations (5×4), where the DL transmission was from the Master AP and for the UL the best Slave AP was determined by exhaustive search.

Figure 7:
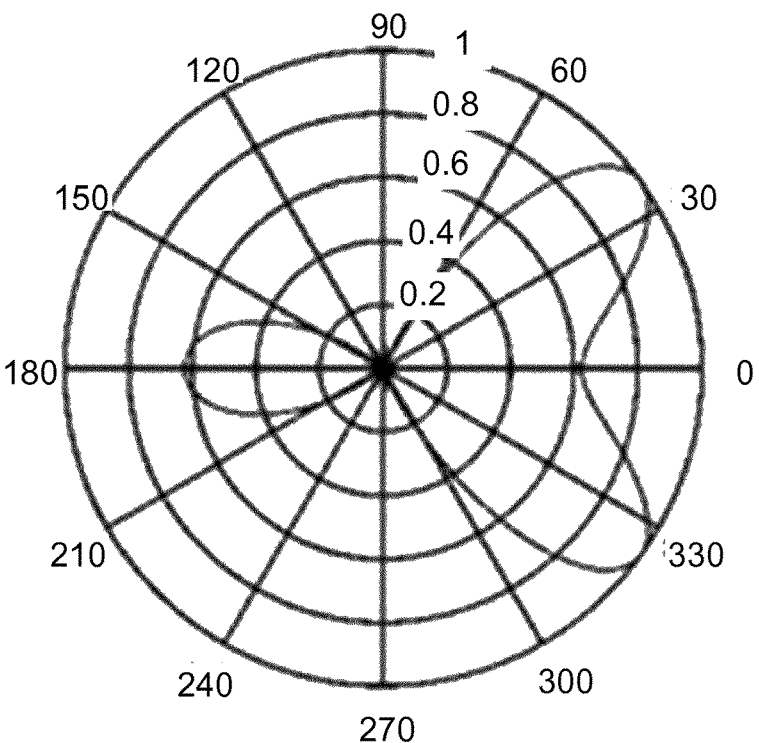
FIG. 7 is an antenna diagram.
Figure 8:
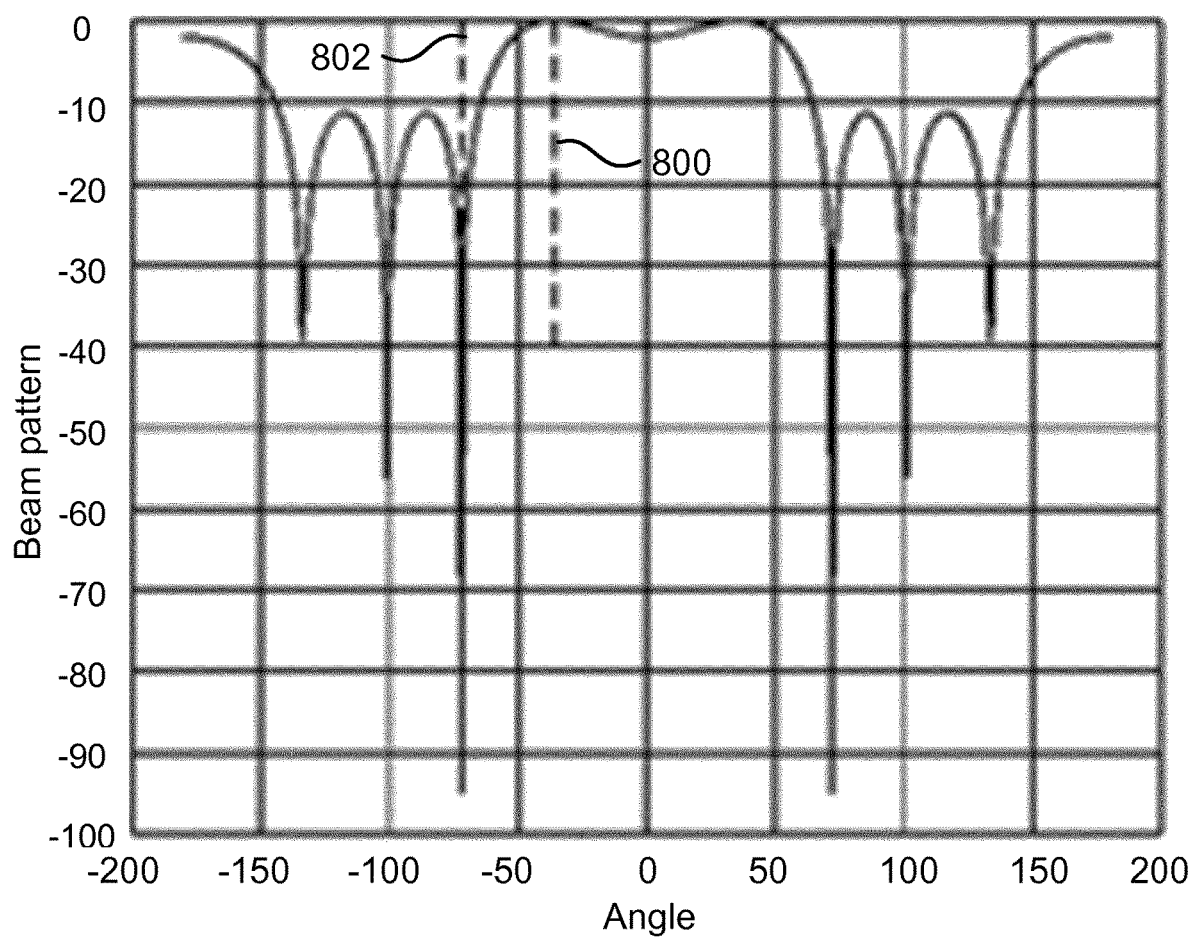
FIG. 8 is a diagram illustrating an amplitude function for the example.

For the example of SUD transmission indicated in FIG. 6, the antenna pattern is designed so that a null is placed towards the Slave AP at −72 degrees (−2/5π). The corresponding antenna diagram is depicted in FIG. 7, and to more easily appreciate the impact of the beamforming the amplitude function of the beam pattern is shown in FIG. 8. In FIG. 8, the dashed vertical lines correspond to the angles of the desired receiver (right dashed line 800) and the Slave AP (left dashed line 802).

As discussed above, the figure of merit is the balanced SINR, which for the 20 different SUD combinations are shown in Table 1. In Table 1, the entry in row r and column c corresponds to the balanced SINR that is obtained for a simultaneous DL transmission to STA r and an UL transmission from STA c.

TABLE 1

| Balanced SINR | | | | |
|---|---|---|---|---|
| balanced_SIR = | | | | |
| 0 | 25.2784 | 27.1994 | 21.0886 | 12.4573 |
| 29.1171 | 0 | 26.2617 | 24.7530 | 13.7153 |
| 35.8526 | 31.0761 | 0 | 25.5599 | 22.6438 |
| 30.5786 | 30.4043 | 26.3967 | 0 | 19.7475 |
| 24.1308 | 21.5500 | 25.6641 | 21.9310 | 0 |

In addition to determining what balanced SINR may be achieved for a specific pair of STAs for UL and DL, Table 1 is also useful to find suitable pairs for SUD transmission. Referring to Table 1, it can for instance be seen that in case STA 5 is to send UL (the last column), then one should if possible avoid to schedule STAT or STA2 for DL if there is DL data available for STA3 or STA4.

Having described the general idea of the approach, a few different embodiments aligned with this general idea are briefly identified below. From these identified embodiments, a skilled reader will readily realize modifications, e.g. combinations of features, forming further embodiments.

According to one embodiment, a system is disclosed where two or more APs are used for simultaneous transmission and reception to/from two or more STAs. Of the two or more APs, one is denoted a first AP or Master AP and used for all DL transmissions. The other APs are used only for reception of UL transmissions, and which one of the APs is used for receiving UL transmission depends on which one of the STAs is performing UL transmission.

The embodiment further includes that the Master AP employs multiple antennas for transmission and uses the multiple antennas to intentionally reduce the interference in the direction of the AP intended to receive UL transmission by e.g. beamforming. An alternative is to use MU-MIMO transmission in the DL. That is, more than one STA is served in the DL at the same time as at least one STA is served in the UL. This follows the same philosophy, but in this case the selection of what STAs to server in the DL take into account into their relative location to the STA served in the UL as all the STAs served in the DL will suffer from interference from the UL transmission.

The embodiment may further include that transmission power control (TPC) is used, and where the TPC is used to balance the SINR for the UL and the DL as described above.

Another embodiment is similar to the embodiment elucidated above, but where all APs may be used for both UL and DL transmission. That is, the Master AP may be used for UL transmission and DL transmission may be done by the Slave APs.

Still another embodiment is similar to any of the embodiment elucidated above, but where more than one AP is used for receiving the UL transmissions. Specifically, the transmitted UL signal from one STA is received by two or more APs are combined.

Still another embodiment is similar to any of the embodiment elucidated above, but where more than one AP is transmitting in the DL, and where the transmissions from the different APs are intended for different STAs, i.e., no distributed MIMO is used. Still another embodiment is similar to any of the embodiment elucidated above, but where more than two STAs are scheduled for UL transmission and where the two or more UL transmissions are scheduled for being received by different APs.

When more STAs are used for UL and DL, the idea is generalized in the sense that all APs transmitting DL will take into account what APs will be used for UL reception and will try to reduce the interference towards these by placing null in these directions. Similarly, since now interference towards a DL transmission will come from multiple UL transmissions, the selection of what STAs to schedule will be extended accordingly.

Figure 9:
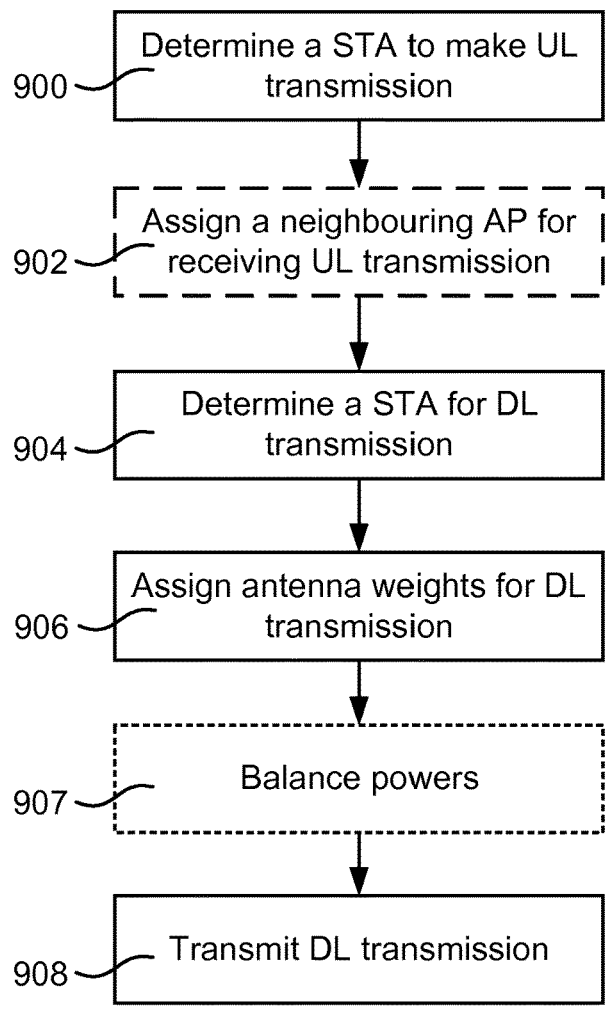
FIG. 9 is a flow chart illustrating a method according to an embodiment.

FIG. 9 is a flow chart illustrating methods according to some embodiments of this disclosure. The method is performed by a first AP, or Master AP as referred to above. The method comprises determining 900 that a first station is to transmit uplink data in an uplink transmission at a first frequency band in the unlicensed spectrum. The determining 900 that the first station is to transmit uplink data may comprise scheduling the first station for the uplink transmission, and signalling to the first station about performing the uplink transmission. The scheduling may alternatively be made by another entity, e.g. a neighbouring AP, wherein the determining that the first station is to transmit uplink data may comprise receiving signalling from the neighbouring AP that the first station is scheduled by the neighbouring AP for uplink transmission.

The method further comprises assigning 902 a second AP, or Slave AP as referred to above, for receiving the uplink transmission. The second AP is covering at least an overlapping area with a coverage area of the first AP. The assigning 902 of the second AP for receiving the uplink transmission may include signalling between the first and second APs. For the case where the scheduling of the first station is performed by another entity, the assigning 902 may be optional since the assigning 902 is already inherent to be the other scheduling entity. The "assigning" 902 may in that case be just a formal stating which is the second AP, which knowledge will be used as demonstrated below. The signalling between the first and the second APs may be provided via a wired interface between the first and the second APs. The assigning 902 of the second AP may be based on that a candidate AP for the second access point will receive the signal from the first station at a signal power above a threshold. The selecting of a candidate AP as the second AP may include selecting the one which will receive the signal from the first station at the highest power among candidate APs. The selecting among the candidate APs may include considerations related to power balancing as discussed above.

The method includes determining 904 a second station targeted for downlink transmission. The downlink transmission is scheduled for at least partly simultaneous transmission with the uplink transmission from the first station and at least partly overlapping the first frequency band. The determining 904 includes a selection of the second station targeted for downlink transmission. The selection is based on a spatial relationship between the first and second stations, as discussed above. The determining of the second station targeted for downlink transmission to be based on a spatial relationship between the first and second stations may include estimating a direction difference between the first station and the second station and selecting the second station prioritizing a candidate station having larger direction difference to the first station higher than a candidate station having a smaller direction difference to the first station. This is to avoid transmission by the first station interfering too much with the reception at the second station.

The method includes assigning 906 antenna weights for an array antenna of the first AP to provide beamforming transmission of the downlink transmission towards the second station and a null towards the second AP. Here, assigning a null towards the second AP means that a beamforming pattern provides a limited power, compared with main lobe and any side lobes of the beamforming pattern, towards the second AP. An absolute "null" is of course seldom possible in a real operating setup.

The method includes transmitting 908 the downlink transmission using the antenna weights.

Returning to the discussion about power balancing, the method may include controlling 907 transmission powers of the uplink and downlink transmissions, wherein assigning of the uplink transmission power and the downlink transmission power are balanced such that a ratio between received downlink transmission power at the second station and received interference power from the uplink transmission plus noise within the first frequency band at the second station is above a first threshold. For example, the first threshold may correspond to a signal-to-interference ratio of 20 dB. The assigning of balanced powers may be done such that a ratio between the received signal power from the uplink transmission and noise within the first frequency band at the second access point is above a second threshold. The second threshold corresponds to a signal-to-noise ratio of 20 dB. The balanced powers may be adapted such that the first and second thresholds are equal, e.g. both are balanced to be 18 dB if that is what the situation allows. An approach is that the transmission powers are selected such that the relative SINR for the DL and UL are selected based on the relative difference in what data rates are suitable for the DL and UL, and where the suitable data rates e.g. are based on the amount of data are to be transmitted in the DL and UL, respectively. This provides for efficient usage of available resources.

The method may also include further UL transmissions in the area. The method may for example comprise determining that a third station is to transmit uplink data in a second uplink transmission, wherein the downlink transmission is scheduled for at least partly simultaneous transmission with the second uplink transmission from the third station and at least partly overlapping the first frequency band. The determining that the third station is to transmit uplink data may comprise scheduling the third station for the second uplink transmission, and signalling to the third station to perform the second uplink transmission. Alternatively, another entity may take care of the scheduling, wherein the determining that the third station is to transmit uplink data may comprise receiving signalling from a neighbouring access point that the third station is scheduled by the neighbouring access point for the second uplink transmission.

The first AP assigs a third AP in the neighbourhood for receiving the second uplink transmission, wherein the third AP is covering at least an overlapping area with a coverage area of the first access point. The first AP then assigns the antenna weights for the array antenna for providing a null towards the third access point. Here, the assigning of the third AP and the assigning of antenna weights may include joint considerations such that the third AP is selected among candidate APs such that suitable antenna weights are assignable. Similar to the solution demonstrated above, the assigning of the third access point for receiving the second uplink transmission may include signalling between the first and third access points. The signalling between the first and the third access points may be provided via a wired interface between the first and the third access points.

The introduction of further UL transmissions in the area may introduce further considerations for the DL transmission. For example, the selection of the second station targeted for downlink transmission may further be based on a spatial relationship between the third and second stations and the determining of the second station targeted for downlink transmission is further to be based on a spatial relationship between the third and second stations. The determining may further include estimating a direction difference between the third station and the second station and selecting the second station prioritizing a candidate station having a higher direction difference to the third station than a candidate station having a smaller direction difference to the third station. Furthermore, power balancing similar to what has been discussed above may be employed for the multi-UL scenario. For example, the assigning of the third AP may be based on that a candidate AP for the third AP will receive the signal from the third station at a signal power above a threshold. A selection of a candidate AP for being the third AP may for example fall on the AP which will receive the signal from the third station at the highest power among candidate APs. A controlling of transmission powers of the second UL transmission may for example include assigning of UL transmission power by the third station and the downlink transmission power are balanced such that a ratio between received downlink transmission power at the second station and received interference power from the first and second uplink transmissions plus noise within the first frequency band at the second station is above a threshold. The balancing may be done such that all receivers, i.e., the second station and the second and third APs, experience an equal SINR.

Figure 10:
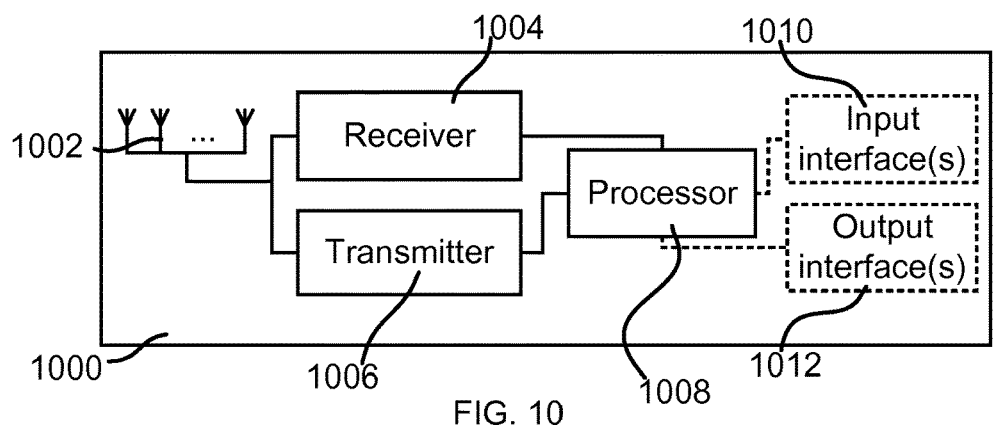
FIG. 10 is a block diagram schematically illustrating an AP according to an embodiment.

FIG. 10 is a block diagram schematically illustrating an AP 1000 according to an embodiment. The AP 1000 comprises an antenna arrangement 1002, a receiver 1004 connected to the antenna arrangement 1002, a transmitter 1006 connected to the antenna arrangement 1002, which preferably is an antenna array, a processing element 1008 which may comprise one or more circuits, one or more input interfaces 1010 and one or more output interfaces 1012. The interfaces 1010, 1012 can be user interfaces and/or signal interfaces, e.g. electrical or optical. The AP 1000 is arranged to operate in a wireless communication network. In particular, by the processing element 1008 being arranged to perform the embodiments demonstrated with reference to FIGS. 1 to 9, the AP 1000 is capable of acting as a first AP, or Master AP. The processing element 1008 can also fulfil a multitude of tasks, ranging from signal processing to enable reception and transmission since it is connected to the receiver 1004 and transmitter 1006, executing applications, controlling the interfaces 1010, 1012, etc.

Figure 11:
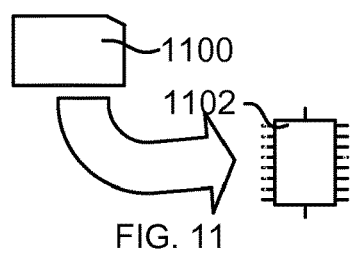
FIG. 11 schematically illustrates a computer-readable medium and a processing device.

The methods according to the present invention is suitable for implementation with aid of processing means, such as computers and/or processors, especially for the case where the processing element 1008 demonstrated above comprises a processor handling determinations, assignments, scheduling, etc. as demonstrated above. Therefore, there is provided computer programs, comprising instructions arranged to cause the processing means, processor, or computer to perform the steps of any of the methods according to any of the embodiments described with reference to FIG. 1 to 9. The computer programs preferably comprise program code which is stored on a computer readable medium 1100, as illustrated in FIG. 11, which can be loaded and executed by a processing means, processor, or computer 1102 to cause it to perform the methods, respectively, according to embodiments of the present invention, preferably as any of the embodiments described with reference to FIGS. 1 to 9. The computer 1102 and computer program product 1100 can be arranged to execute the program code sequentially where actions of the any of the methods are performed stepwise, or be performed on a real-time basis. The processing means, processor, or computer 1102 is preferably what normally is referred to as an embedded system. Thus, the depicted computer readable medium 1100 and computer 1102 in FIG. 11 should be construed to be for illustrative purposes only to provide understanding of the principle, and not to be construed as any direct illustration of the elements.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method performed by a first access point arranged to provide wireless communication access in unlicensed spectrum, the method comprising determining that a first station is to transmit uplink data in an uplink transmission at a first frequency band in the unlicensed spectrum;

assigning a second access point for receiving the uplink transmission, wherein the second access point has a second coverage area that overlaps a first coverage area of the first access point;

selecting a second station targeted for downlink transmission that is scheduled at least partly simultaneous with the uplink transmission from the first station and at least partly overlapping the first frequency band, wherein selecting the second station is based on a spatial relationship between the first and second stations;

assigning antenna weights, for an antenna array of the first access point, to provide beamforming of the downlink transmission towards the second station and to provide a null towards the second access point;

assigning transmission powers of the uplink transmission from the first station and of the downlink transmission from the first access point such that a signal-to-interference-plus-noise (SINR) ratio at the second station will be above a first threshold, wherein the SINR is based on the following at the second station:
received signal power of the downlink transmission; and
received interference power of the uplink transmission plus noise within the first frequency band; and transmitting the downlink transmission to the second station via the antenna array based on the assigned antenna weights, wherein the downlink transmission is transmitted at least partly in the first frequency band and at least partly simultaneous with the uplink transmission from the first station to the second access point in the overlapping coverage area.

2. The method of claim 1, wherein assigning the second access point for receiving the uplink transmission includes signalling between the first and second access points.

3. The method of claim 1, wherein determining that the first station is to transmit uplink data comprises one of the following:
scheduling the first station for the uplink transmission and signalling to the first station about performing the uplink transmission; or
receiving signalling from a neighbouring access point that the first station is scheduled by the neighbouring access point for uplink transmission.

4. The method of claim 1, wherein selecting the second station targeted for downlink transmission based on the spatial relationship between the first and second stations comprises:
estimating a direction difference between the first station and the second station; and
selecting the second station based on the second station having a larger direction difference to the first station than one or more other candidate stations.

5. The method of claim 1, wherein assigning the second access point is based on that the second access point will receive a signal from the first station at a signal power above a threshold.

6. The method of claim 5, wherein assigning the second access point comprises selecting the second access point based on that the second access point will receive the signal from the first station at highest power among candidate access points.

7. The method of claim 1, wherein assigning the transmission powers of the uplink transmission from the first station and the downlink transmission is performed such that, at the second access point, a ratio between the received signal power from the uplink transmission and noise within the first frequency band is above a second threshold.

8. The method of claim 7, wherein the first and second thresholds are equal.

9. The method of claim 7, wherein:
the first threshold corresponds to an SINR of 20 dB; and
the second threshold corresponds to a signal-to-noise ratio of 20 dB.

10. The method of claim 1, further comprising:
determining that a third station is to transmit uplink data in a second uplink transmission that is scheduled at least partly simultaneous with the downlink transmission and at least partly overlapping the first frequency band;
assigning a third access point for receiving the second uplink transmission, wherein the third access point has a third coverage area that overlaps with the first coverage area of the first access point,
wherein assigning the antenna weights for the antenna array of the first access point also provides a null towards the third access point.

11. The method of claim 10, wherein assigning the third access point for receiving the second uplink transmission includes signalling between the first and third access points.

12. The method of claim 10, wherein determining that the third station is to transmit uplink data comprises one of the following:
scheduling the third station for the second uplink transmission and signalling to the third station to perform the second uplink transmission; or
receiving signalling from a neighbouring access point that the third station is scheduled by the neighbouring access point for the second uplink transmission.

13. The method of claim 10, wherein:
selecting the second station targeted for downlink transmission is further based on a spatial relationship between the third station and the second station.

14. The method of claim 13, wherein selecting the second station further comprises:
estimating a direction difference between the third station and the second station; and
selecting the second station based on the second station having a larger direction difference to the third station than one or more other candidate stations.

15. The method of claim 10, where assigning the third access point is based on that the third access point will receive a signal from the third station at a signal power above a threshold.

16. The method of claim 15, wherein assigning the third access point comprises selecting the third access point based on that the third access point will receive the signal from the third station at highest power among candidate access points.

17. The method of claim 10, further comprising assigning transmission power of the second uplink transmission such that a ratio between the following is above a third threshold:
received downlink transmission power at the second station; and
at the second station, a sum of the following: received interference power from the uplink transmission, received interference power from the second uplink transmission, and noise within the first frequency band.

18. A first access point arranged to provide wireless communication access in unlicensed spectrum, the first access point comprising
transceiver circuitry;
an antenna array connected to the transceiver;
a communication interface configured to communicate with at least a second access points having a second coverage area that overlaps a first coverage area of the first access point; and controller circuitry configured to control transmissions performed by the transceiver, antenna weights of the antenna array, and the communication interface, wherein the controller is further configured to cause the first access point to:
  determine that a first station is to transmit uplink data in an uplink transmission at a first frequency band in the unlicensed spectrum;
  assign a second access point for receiving the uplink transmission, wherein the second access point has a second coverage area that overlaps a first coverage area of the first access point;
  select a second station targeted for downlink transmission that is scheduled at least partly simultaneous with the uplink transmission from the first station and at least partly overlapping the first frequency band, wherein selecting the second station is based on a spatial relationship between the first and second stations;
  assign antenna weights, for an antenna array of the first access point, to provide beamforming of the downlink transmission towards the second station and to provide a null towards the second access point;
  assign transmission powers of the uplink transmission from the first station and of the downlink transmission from the first access point such that a signal-to-interference-plus-noise (SINR) ratio at the second station will be above a first threshold, wherein the SINR is based on the following at the second station:
    received signal power of the downlink transmission; and
    received interference power of the uplink transmission plus noise within the first frequency band; and
  transmit the downlink transmission to the second station via the antenna array based on the assigned antenna weights, wherein the downlink transmission is transmitted at least partly in the first frequency band and at least partly simultaneous with the uplink transmission from the first station to the second access point in the overlapping coverage area.

\* \* \* \* \*